N. J. GONDOLF.
FLUSHING DEVICE.
APPLICATION FILED JAN. 28, 1914.

1,181,759.

Patented May 2, 1916.
2 SHEETS—SHEET 1.

WITNESSES
H. C. Barry
J. P. McAuliffe

INVENTOR
Nicholas J. Gondolf
BY Munn & Co
ATTORNEYS

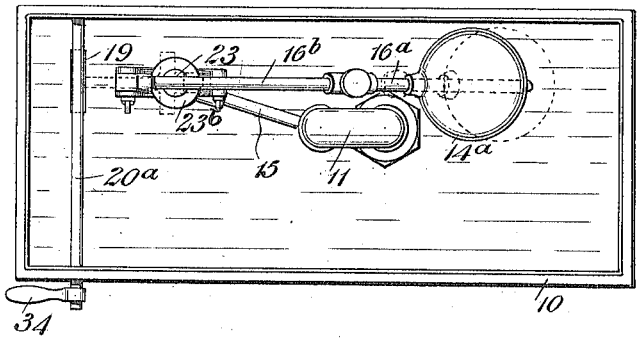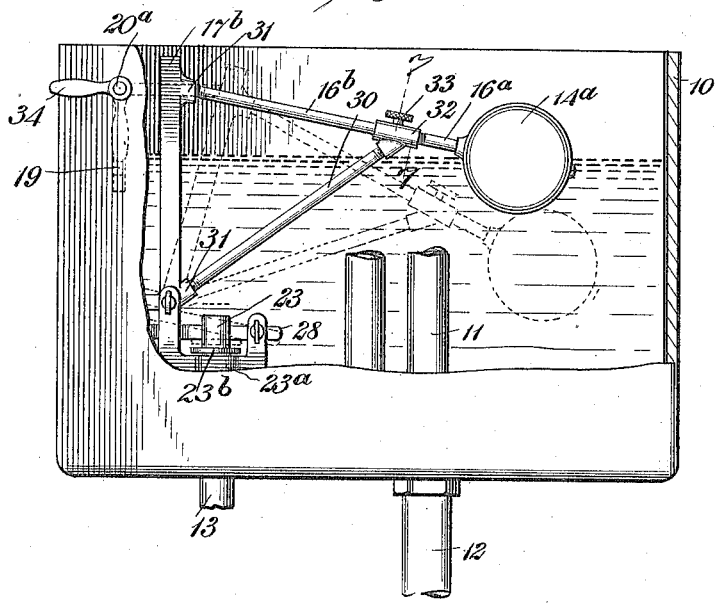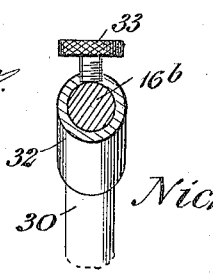

UNITED STATES PATENT OFFICE.

NICHOLAS JOSEPH GONDOLF, OF NEW ORLEANS, LOUISIANA.

FLUSHING DEVICE.

1,181,759.  Specification of Letters Patent.  Patented May 2, 1916.

Application filed January 28, 1914. Serial No. 814,951.

*To all whom it may concern:*

Be it known that I, NICHOLAS J. GONDOLF, a citizen of the United States, and a resident of New Orleans, in the parish of Orleans and State of Louisiana, have invented a new and Improved Flushing Device, of which the following is a full, clear, and exact description.

My present invention relates principally to a flushing device in which the float is depressed to start the siphon, and in practice, the features relating to the float are associated with a jet starter to further contribute to the starting of the siphon.

My invention resides principally in a novel retaining means to engage the float-carrying structure and retain the float in depressed position, to prevent the float from rebounding, without the employment of adventitious locking means, the continued lowering of the float due to the emptying of the tank, serving to release the float from the retainer, leaving the float free to rise as the tank again fills.

In my invention, a rockable member operated by the usual pull chain or lever directly engages the float-carrying member, to depress the float sufficiently to start the siphon, and the pressure due to the buoyancy of the float causes the float to be retained in the depressed position against any tendency to rebound, but free to drop farther with the falling water level, to release the retainer.

Other features of the invention will appear from the more specific description following.

Reference is to be had to the accompanying drawings forming a part of this specification in which similar characters of reference indicate corresponding parts in all the views.

Figure 1:
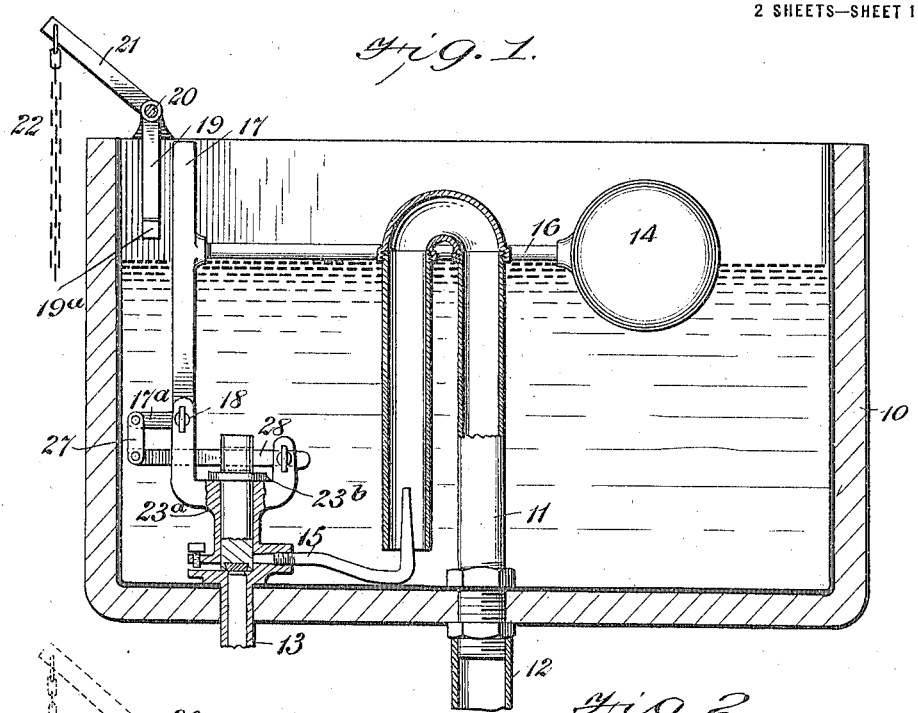
Figure 2:
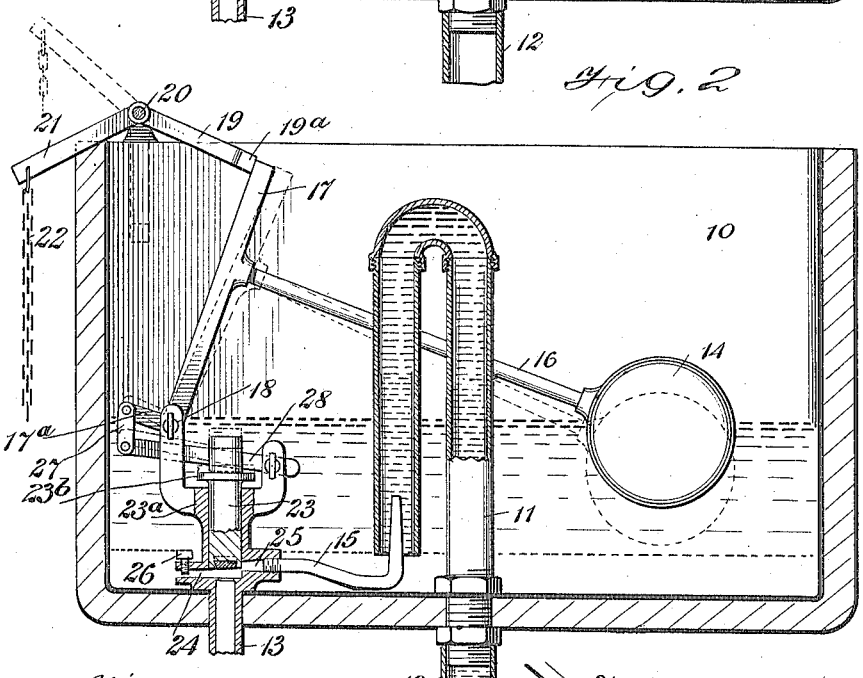
Figure 3:
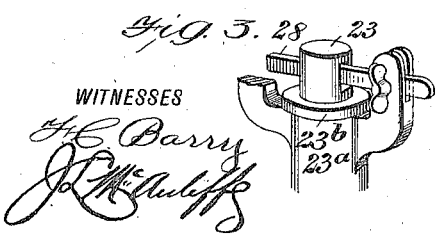
Figure 4:
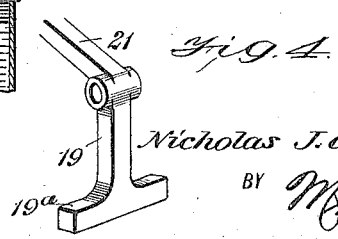

Figure 1 is a partly sectional side elevation of a flushing device embodying my invention, showing the float in the raised position and the tank filled; Fig. 2 is a similar view, with the float depressed and the tank partly emptied; Fig. 3 is a fragmentary detail in perspective, showing the inlet valve and an operating lever therefor; Fig. 4 is a fragmentary perspective view showing the retainer for holding the float in the depressed position; Fig. 5 is a plan view showing another form of the float; Fig. 6 is a side elevation of the device shown in Fig. 5, portions of the tank being broken away; and Fig. 7 is a detail in cross section on the line 7—7 of Fig. 6.

The invention is applicable to any conventional tank 10 having the usual siphon 11 connected with the discharge 12 and an inlet pipe 13. A ball float 14 is adapted to be depressed for starting the flushing action, and preferably a starting jet 15, entering the short leg of the siphon is also employed, and receives a supply of water from the inlet 13, the elements referred to being of any approved construction.

Referring more particularly to Figs. 1, 2 and 4, the float 14 is carried on the free end of a float rod 16 suitably secured to a lever 17 which is fulcrumed, as at 18, on the valve casing hereinafter referred to, to rock in the vertical plane. When the float is depressed from the raised position shown in Fig. 1 to the partially lowered position shown in Fig. 2, or approximately to the latter position, sufficient water will be displaced to start the siphon, and in order to prevent the upward rebound of the float when depressed for starting the flushing action, I provide a retainer 19, which is movable to a position to engage the lever 17 associated with the float, and thus hold the latter in the depressed position. In the illustrated example, the retainer 19 is utilized to depress the float in response to the rocking of the usual shaft 20 or its equivalent by the lever 21 having a pull chain 22 or other actuating means. The retainer 19 is thus in the form of a vertically rocking arm which normally tends, by gravity, to drop to the lowered position indicated in Fig. 1 and in dotted lines, Fig. 2. To insure engagement with the lever 17, the free end of the retaining arm 19 is broadened, being provided with a T-head 19ª, so that any loosening of the parts will not permit the lever to slip to either side of the retainer. The engagement between the retainer and the lever 17 is frictional, and the buoyancy of the float will cause the lever to have binding engagement with the retainer and prevent the latter from gravitating and releasing the float until the float falls to a still lower position, that is, substantially to the low level of the tank. As the float approaches the lowermost position due to the fall of the water as the tank empties, the lever 17 will relieve the pressure on the retainer 19, and permit the latter to drop, so that as the water again rises in the tank, after the siphon action breaks, the ball will be free to rise. The means shown for connecting the float with the valve 23, consists of a bell crank arm 17$^a$ on the lever 17, a link 27 and a lever 28, the construction being merely designed to effect the opening and closing movements of the valve 23 in its casing 23$^a$, by the raising and lowering of the float. The said casing has an outlet or "tank-fill" 24 to discharge water to the tank, and a branch outlet 25 leading to the siphon jet 15. In order to regulate the discharge through the tank-fill to insure the necessary pressure in the starting jet, I provide an adjustable intruding device 26, advantageously in the form of a set screw. It will be observed that the valve 23 has an annular flange 23$^b$ above the valve casing 23$^a$, which will deflect any water escaping between the valve and casing and prevent the same from spouting to the top of the tank. The provision of the integral flange avoids the necessity of employing the usual washer to prevent spouting.

Referring to the arrangement shown in Figs. 5 to 7, the retainer 19 is the same as previously described, and the lever 17$^b$ is essentially the same as the lever 17. The manner of sustaining the ball 14$^a$ on the lever is, however, modified in a way to adapt the device to low tanks. The float rod 16$^a$ is disposed at an inclination to the lever 17, and an inclined brace 30 is provided beneath the same. The said float rod and brace are formed of light metal rod and are capable of more or less flexure. The connection between the float rod and the lever 17$^b$ and between the brace and the said lever, may be effected by the threaded ends of the said rod and brace taking into bosses 31 on the lever. The brace 30 at its upper end has threaded engagement with a Y-coupling 32, and the rod 16$^b$ extends slidably through the said coupling. A set screw 33 in the coupling is adapted to bind against the rod 16$^b$. By loosening the set screw the rod 16$^b$ and the brace 30 may be sprung so as to raise or lower the said rod. The set screw 33 may then make the parts fast in the adjusted position.

In the form shown in Figs. 5 and 6, the retainer 19 is mounted on a shaft 20$^a$ which may be rocked by a handle 34, or by other approved means.

In both constructions the rockable float-supporting structure is directly engaged by and operated by the retainer, and in both instances the retainer thus is utilized to effect the depressing movement of the float and to lock the float against rebound, without the employment of an adventitious locking means.

Having thus described my invention, I claim as new, and desire to secure by Letters Patent:

In a flushing device, a float, a lever, a rod carrying the float and connected at one end with the lever, an inclined brace connected at one end with the lever and having a sliding connection with the said rod, the said brace and rod being bendable to permit a sliding movement of the rod relatively to the brace, for raising or lowering the float, means for holding the rod and brace in adjusted position, and means to rock the lever to depress the float.

In testimony whereof I have signed my name to this specification in the presence of two subscribing witnesses.

NICHOLAS JOSEPH GONDOLF.

Witnesses:
L. C. SMITH,
H. J. ASTUGUE.